(12) United States Patent
Thompson et al.

(10) Patent No.: US 9,208,371 B2
(45) Date of Patent: Dec. 8, 2015

(54) LOW POWER NAVIGATION DEVICES, SYSTEMS AND METHODS

(71) Applicant: Synaptics Incorporated, San Jose, CA (US)

(72) Inventors: Erik Jonathon Thompson, Phoenix, AZ (US); Frank Schwab, Phoenix, AZ (US); Anthony P. Russo, New York, NY (US); Bjoren Davis, Boston, MA (US); Charles Bellman, Tempe, AZ (US); Gregory Lewis Dean, Standish, ME (US); Philip Yiu Kwong Chan, Fremont, CA (US); Jaswinder Jandu, Chandler, AZ (US)

(73) Assignee: Synaptics Incorporated, San Jose, CA (US)

( * ) Notice: Subject to any disclaimer, the term of this patent is extended or adjusted under 35 U.S.C. 154(b) by 107 days.

(21) Appl. No.: 14/037,647

(22) Filed: Sep. 26, 2013

(65) Prior Publication Data

US 2014/0093143 A1 Apr. 3, 2014

Related U.S. Application Data

(60) Provisional application No. 61/707,725, filed on Sep. 28, 2012.

(51) Int. Cl.
*G06K 9/00* (2006.01)
*G05B 19/00* (2006.01)
*G06F 1/32* (2006.01)

(52) U.S. Cl.
CPC .......... *G06K 9/00033* (2013.01); *G06F 1/3259* (2013.01); *Y02B 60/1253* (2013.01)

(58) Field of Classification Search
CPC .......... G06K 9/00026; G06K 9/00006; G06K 9/00033; G06K 9/00046; G06K 9/00067; G06K 9/00335; G06F 2203/0338; G06F 3/0317; G06F 3/03547; G06F 2203/04109; G06F 3/0421; G06F 1/3259; G06F 3/041
USPC ......... 382/124, 107, 115, 312, 125, 126, 116, 382/128, 100, 155, 168, 173, 181, 254, 276, 382/282, 286, 305, 307, 291, 289, 195; 340/5.8, 5.81, 5.82, 5.83, 5.51, 5.52, 340/5.53; 310/300, 311, 314, 316.01
See application file for complete search history.

(56) References Cited

U.S. PATENT DOCUMENTS 7,158,659 B2 * 1/2007 Baharav et al. ............... 382/124
7,164,782 B2 * 1/2007 Baharav et al. ............... 382/124

(Continued)

*Primary Examiner* — Sheela Chawan
(74) *Attorney, Agent, or Firm* — Leydig, Voit & Mayer Ltd

(57) ABSTRACT

A system and method are disclosed for conserving power during navigation, e.g., user device pointer/cursor navigation, using a fingerprint image sensor, that may comprise processing, via a computing device, fingerprint image sensor data indicative of finger position and movement with respect to a fingerprint image sensor surface in a finger navigation mode to determine if the finger is in a first finger navigation mode; processing, via the computing device, fingerprint image sensor data indicative of finger position and movement with respect to a fingerprint image sensor surface in a finger navigation mode to determine if the finger is in a second finger navigation mode; and transitioning, via the computing device, the fingerprint image sensor from a first power consumption mode to a second power consumption mode, based on detecting a transition from the first finger navigation mode to the second finger navigation mode.

20 Claims, 5 Drawing Sheets

(56) References Cited

U.S. PATENT DOCUMENTS

| | | | |
|---|---|---|---|
| 7,274,808 B2* | 9/2007 | Baharav et al. | 382/124 |
| 7,643,950 B1 | 1/2010 | Getzin et al. | |
| 8,031,046 B2 | 10/2011 | Franza et al. | |
| 8,278,946 B2* | 10/2012 | Thompson et al. | 324/658 |
| 8,594,391 B2* | 11/2013 | Machida | 382/124 |
| 8,792,683 B2* | 7/2014 | Ramrattan et al. | 382/115 |
| 2010/0176892 A1 | 7/2010 | Thompson et al. | |
| 2010/0180136 A1 | 7/2010 | Thompson et al. | |
| 2012/0075451 A1* | 3/2012 | Raynor | 348/77 |

\* cited by examiner

LOW POWER NAVIGATION DEVICES, SYSTEMS AND METHODS

CROSS-REFERENCE

This application claims the benefit of U.S. Provisional Application No. 61/707,725, entitled Low Power Navigation, Devices, Systems, and Methods, filed Sep. 28, 2012, which application is incorporated herein by reference.

FIELD OF THE APPLICATION

The present application relates to a method for power conservation for an electronic device, and, more particularly, to a method for conserving power in a finger sensor of a fingerprint imaging apparatus during usage of the finger sensor for navigation.

BACKGROUND

Finger scanners have been developed that detect the motion of the finger and translate the finger motion into corresponding motion (navigation) of a cursor or pointer. Such finger scanners have been integrated in laptop computers, cell phones, personal digital assistants, and other electronic devices. Since many of these devices are portable, they are frequently powered by batteries. In such devices, the conservation of power during the use of the finger scanner for navigational purposes is desirable because this will extend the useful period of battery operation.

SUMMARY

It will be understood by those skilled in the art that a system and method for conserving power during navigation using a fingerprint image sensor is disclosed which may comprise receiving at a computing device fingerprint image sensor data indicative of finger position with respect to a fingerprint image sensor surface in a finger navigation mode to determine if the finger is in a first finger navigation mode; processing via the computing device, fingerprint image sensor data to determine the presence of redundant fingerprint image data to detect the finger in a second finger navigation mode; and transitioning via the computing device, the finger sensor from a first power consumption mode to a second power consumption mode, based on detecting a transition from the first finger navigation mode to the second finger navigation mode. The first navigation mode may be indicated by the finger being detected to relatively quickly be alternately in contact with and not in contact with the finger sensor surface, and sensed fingerprint image data being substantially non-redundant. The second finger navigation mode may be determined by the finger being detected to be in contact with the finger sensor surface and the sensed fingerprint image data being substantially redundant. The first finger navigation mode may comprise a scrolling finger navigation mode; and the first power consumption mode may comprise a high power mode selected when the finger is moving in contact with the sensor surface and the second power consumption mode is a zero power mode selected when the finger is not in contact with the fingerprint image sensor surface. The second finger navigation mode may comprise a selection finger navigation mode; and the second power consumption mode may comprise an alternating low power mode and a high power mode periodically selected to determine the continuing presence or the absence of the redundancy in the sensed fingerprint image data.

It will be understood that a system and method are disclosed for conserving power during navigation, e.g., user device pointer/cursor navigation, using a fingerprint image sensor, that may comprise processing, via a computing device, fingerprint image sensor data indicative of finger position and movement with respect to a fingerprint image sensor surface in a finger navigation mode to determine if the finger is in a first finger navigation mode; processing, via the computing device, fingerprint image sensor data indicative of finger position and movement with respect to a fingerprint image sensor surface in a finger navigation mode to determine if the finger is in a second finger navigation mode; and transitioning, via the computing device, the fingerprint image sensor from a first power consumption mode to a second power consumption mode, based on detecting a transition from the first finger navigation mode to the second finger navigation mode.

The system and method may also comprise, wherein the first navigation mode is indicated by the finger being detected to relatively quickly be alternately in contact with and not in contact with the finger sensor surface. The system and method may also comprise, wherein the first navigation mode is indicated by the sensed fingerprint image data being substantially non-redundant. The system and method may also comprise the first navigation mode being indicated by the finger being detected to relatively quickly be alternately in contact with and not in contact with the finger sensor surface and the sensed fingerprint image data being substantially non-redundant.

The system and method may also comprise, wherein the second navigation mode is indicated by the finger being detected to be relatively steadily in contact with the finger sensor surface. The system and method may also comprise, wherein the second navigation mode is indicated by the sensed fingerprint image data being substantially redundant. The system and method may also comprise the first navigation mode being indicated by the finger being detected to be relatively steadily contact with the finger sensor surface and the sensed fingerprint image data being substantially redundant.

The system and method may also comprise periodically energizing, via the computing device, the fingerprint image sensor, during a period of time the fingerprint image sensor is determined to be in the first navigation mode, to detect a transition of the finger position from a first position relative to the fingerprint image sensor surface to a second position relative to the fingerprint image sensor surface; and determining, via the computing device, that fingerprint image sensor data received from the energized fingerprint image sensor is indicative of lateral motion of a finger being sensed in relation to the fingerprint image sensor surface. The system and method may also comprise periodically energizing, via the computing device, the fingerprint image sensor, during the a period of time the fingerprint image sensor is determined to be in the second navigation mode, to detect fingerprint image sensor data indicative of no lateral motion of a finger being sensed in relation to the fingerprint image sensor surface.

The system and method may also comprise a non-transitory computer readable medium storing instructions that, when executed by a computing device, cause the computing device to perform a method for conserving power during navigation using a fingerprint image sensor, the method which may comprise processing, via a computing device, fingerprint image sensor data indicative of finger position and movement with respect to a fingerprint image sensor surface in a finger navigation mode to determine if the finger is in a first finger navigation mode; processing, via the computing device, fingerprint image sensor data indicative of finger position and movement with respect to a fingerprint image sensor surface in a finger navigation mode to determine if the finger is in a second finger navigation mode; and transitioning, via the computing device, the fingerprint image sensor from a first power consumption mode to a second power consumption mode, based on detecting a transition from the first finger navigation mode to the second finger navigation mode.

INCORPORATION BY REFERENCE

All publications, patents, and patent applications mentioned in this specification are herein incorporated by reference to the same extent as if each individual publication, patent, or patent application was specifically and individually indicated to be incorporated by reference. References include, for example, U.S. Pat. No. 7,099,496 B2 to Benkley, issued Aug. 29, 2006, for Swiped Aperture Capacitive Fingerprint Sensing Systems and Methods; U.S. Pat. No. 7,463,756 B2 to Benkley, issued Dec. 9, 2009, for Finger Position Sensing Methods and Apparatus; U.S. Pat. No. 8,165,355 B2 to Benkley, issued Apr. 24, 2012, for Method and Apparatus for Fingerprint Motion tracking Using an In-Line Array for Use in Navigation Applications; U.S. Pat. No. 7,751,601 B2 to Benkley, issued Jul. 6, 2010, for Finger Sensing Assemblies and Methods of Making; U.S. Pat. No. 8,229,184 B2 to Benkley, issued Jul. 24, 2012, for Method and Algorithm for Accurate Finger Motion Tracking; U.S. Pat. No. 7,643,950 B1 to Getzin, issued Jan. 5, 2010, for System and Method for Minimizing Power Consumption for an Object Sensor.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
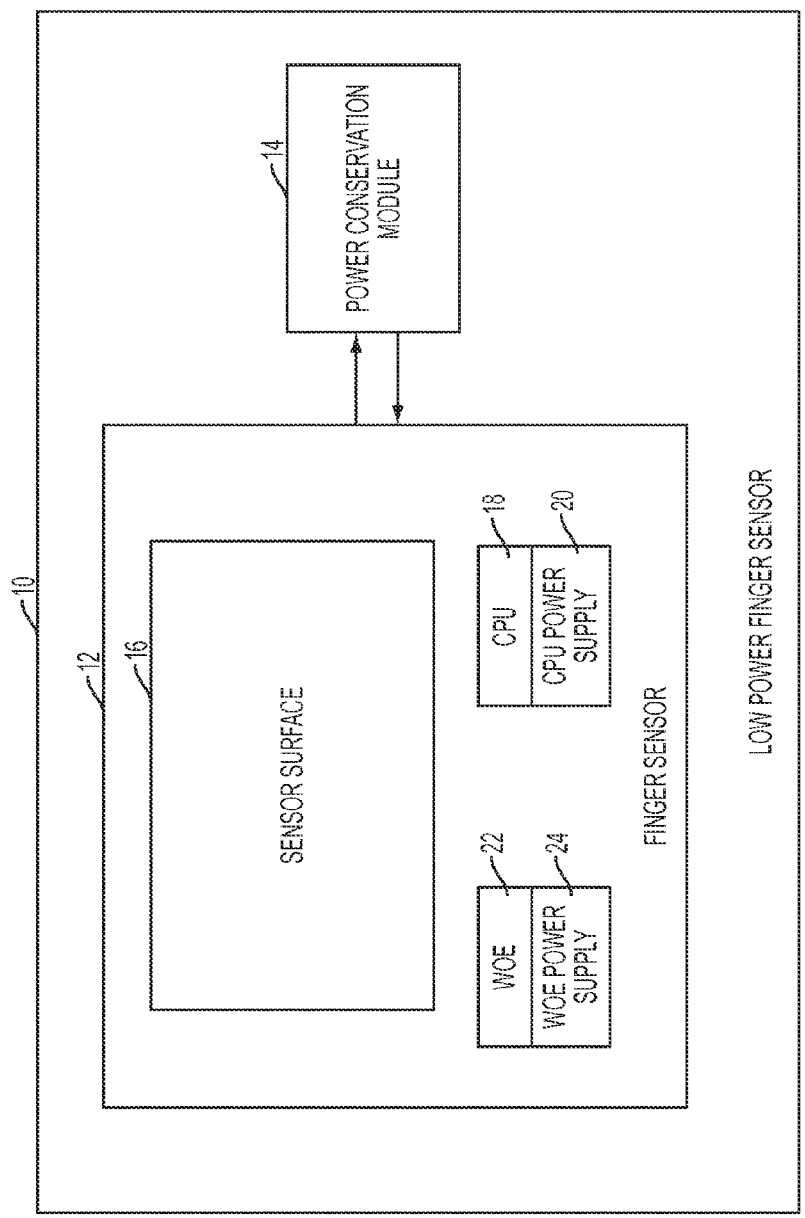
FIG. 1 is a schematic drawing of a low power navigation finger sensor constructed in accordance with one embodiment of the present application.

A method is provided which conserves power during the use of a finger sensor for navigational purposes. A computing device receives finger sensor data which is indicative of finger motion with respect to a finger sensor surface and processes the finger sensor data to determine the presence of a first finger navigation mode or a second finger navigation mode. It will be understood that the real finger motion can have many different "modes" or characteristics of movement across the sensor. For purposes of the present disclosure, it can be presumed that most of the time the finger will be in one of the two modes discussed above. Therefore, one can implement strategies that take advantage of this observation. When the finger moves in such a way that neither of these modes describes the motion, then the sensor can, for example, remain awake and consuming higher power or can be placed in low power, e.g., after some selected threshold time of such non-descript motion mode(s). It will be understood, however, that the two modes occur often enough that the average power will be dominated by the average power consumed according to the operation in each of these two modes as described in the present application. The computing device transitions the finger sensor from a first power consumption mode to a second power consumption mode based on detecting a transition from the first finger navigation mode to the second finger navigation mode. It will also be understood that the system does not actually or necessarily switch from one mode to the other. The CPU can be looking for both motion characteristics simultaneously, and there may be periods, as just discussed, where the sensor is in neither of the modes described above in this application.

Although the present application can be used in conjunction with any type of finger sensor, it is particularly suitable for use in connection with a finger sensor adapted for finger navigation of a cursor or pointer. Accordingly, the present application will be described hereinafter in connection with such a finger sensor. It should be understood, however, that the following description is only meant to be illustrative of the present application and is not meant to limit the scope of the present application, which has applicability to other types of finger sensors, such as security fingerprint scanners.

The present application overcomes the shortcomings discussed above by providing a low power finger scanner that conserves power during the use of the finger scanner for navigational purposes. A method for the variation of the voltage level of a finger scanner, which is supported by firmware code and digital logic, has a usage model that has fast and slow finger motion modes. As noted, the finger can have other modes of motion which are not relevant to system and method as disclosed in this application in the sense that these other modes need not be exploited nor accounted for, as the system and method can take advantage of only the fast or slow motions described herein. For instance, during finger navigation there are pauses in the contact of the finger with the sensor surface during navigational motion of the finger, of which the user may not even be aware. These pauses can be used, in both the fast and slow motion modes, to turn the sensor off, when it is not needed, and to turn the sensor back on when it is needed, thereby conserving power.

In the fast motion mode, during consistent large/rapid gestures (e.g., in order to move the cursor rapidly towards a target icon or object or other position on the screen), the finger is only in contact with the sensor for brief intervals at a time, followed by what may even be larger intervals of time for lifting and repositioning the finger. During the intervals of time in which finger is lifted off of the surface of the sensor, power to the sensor can be turned off, and when the finger is repositioned back onto the surface of the sensor, a finger detect circuit can detect when the finger has returned to the surface of the sensor and turns the power to the sensor back on.

In the slow motion mode, in which the finger is moving slowly with fine tuning motions, for example in positioning a cursor onto or hovering above a target icon, the duration of such finger motions is much longer than the sensor's scanning time intervals. During the intervals of time in which the sensor senses that finger motion scanned data is not changing significantly, but the finger is still indicated to be on the sensor, the sensor can be put on a lower power mode, thereby conserving power. Periodically, e.g., under the control of a wake on event unit, the sensor returns to full power and evaluates a few scan lines. If the few scan lines that are evaluated during this time are still substantially the same as the last unique line (i.e., the scan lines are still redundant and the finger is still moving slowly or not moving at all), the sensor can be returned to the lower-power mode. However, if the sensor detects a unique scan line, the scanner can remain in full power and continues scanning lines.

Figure 2:
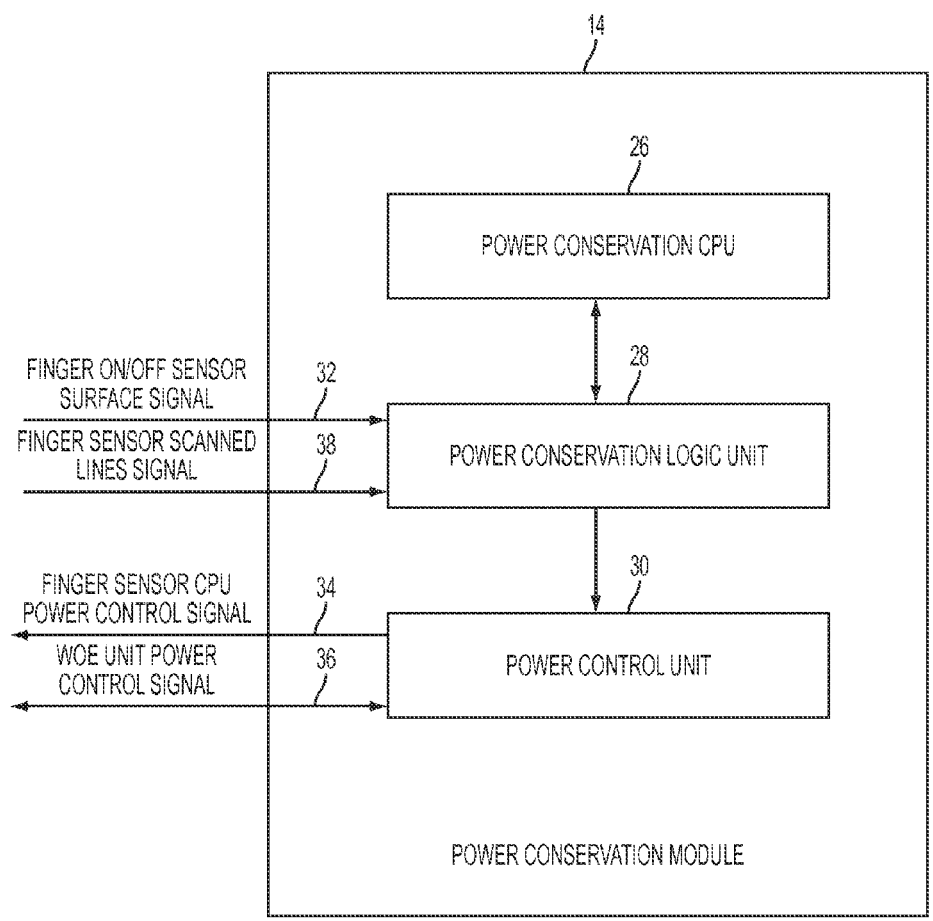
FIG. 2 is a schematic drawing of a power conservation module of the low power finger sensor shown in FIG. 1.

FIGS. 1 and 2 illustrate a low power finger sensor 10 is constructed in accordance with one embodiment of the present application. The low power finger sensor 10 includes a finger sensor 12 and a power conservation module 14. It is understood that the finger sensor 12 can include a conventional finger sensor such as the relative motion sensor disclosed in U.S. Pat. No. 8,165,355 B2 to Benkley, et al., entitled Method and Apparatus for Fingerprint Motion Tracking Using an In-Line Array for Use in Navigation Applications, which is incorporated by reference herein in its entirety. The low power finger sensor 10 has a sensor surface 16, a central processing unit (CPU) 18 which is powered by a CPU power supply 20, and a wake-up on event (WOE) unit 22 which is powered by a WOE unit power supply 24.

As shown in FIG. 2, the power conservation module 14 has a power conservation CPU 26, a power conservation logic unit 28 and a power control unit 30. The power conservation logic unit 28 receives and processes finger on/off surface signals 32 received from the finger sensor 12 and directs the power control unit 30 to send finger sensor CPU power control signals 34 and WOE unit power control signals 36 to the CPU power supply 20 and the WOE unit power supply 24, respectively, for purposes described in the present application. The power conservation logic unit 28 also receives and processes finger sensor scanned line signals 38, and directs the power control unit 30 to send finger sensor CPU power control signals 34 to the CPU power supply 20 and the WOE unit power supply 24, respectively, for purposes described in the present application. Alternatively, the system and method of the disclosed subject matter could do without the Power conservation module 14. In such an embodiment, the CPU 18 can hand off control to the WOE module 22, which can then also return control to the CPU 18. The WOE power supply 24 never needs to actually turn off.

Accordingly, in such an embodiment, the CPU 18 can be collecting image data when the finger comes off the sensor 12. The CPU 18 can detect this and stop scanning data, and may also hand control over to a state machine in the WOE unit 22. The WOE state machine (not shown), can then assume control, and can, e.g., kill power to the CPU 18 (via the CPU Power Supply 20), and the WOE unit 22 can then begin polling for a finger.

The examples of pulses, as seen, by way of example in FIG. 5c, do not represent the WOE power supply 24 switching on and off, since that may not be happening, but instead those pulses represent sampling windows in the WOE unit 22. So, in such an embodiment, the WOE power supply 24 can always be on, but most of the time there are other circuits, which are powered down until samples are needed. When samples are needed, the WOE state machine can power up the sampling circuits, look for a finger, and then power down the sampling circuits and wait until the next sample interval. During this entire time, however, the WOE state machine can be running and counting time. Now, supposing that a finger comes down on the sensor again. Sometime later, the WOE state machine can power up the sampling circuits, these circuits can detect the finger, and the WOE unit 22 can power up the CPU 18 and pass control back to it. Then the CPU 18 can start collecting lines of data, e.g., fingerprint image data.

For the second mode of operation, the CPU 18 can, e.g., be collecting lines of data, e.g., fingerprint image data. While collecting these lines of data, the CPU 18 can be constantly processing them for redundancy (e.g., it will be understood that, as an example, whenever the CPU is up, it is doing this analysis). If the CPU 18 determines that the last N lines were redundant, then the CPU 18 can pass control back to the WOE state machine, and, as will be understood, can at this time command the WOE state machine to not shut the CPU 18 all the way down, but instead to only pause the CPU 18 (i.e., as an example, turn off one or more CPU clocks—not shown) and only lower the CPU power supply 20 to some lower (non-zero) value. After a programmed interval, the WOE unit 22 can restore power from or to the power supply 20 and pass control back to the CPU 18.

In summary, by way of example, both modes can work such that the CPU 18 can direct the WOE unit 22 to shut down the CPU, e.g., by de-energizing the CPU and/or the power supply to the CPU, until such time as the WOE unit 22 detects a finger. Similarly, the CPU 18 can direct the WOE unit 22 to pause the CPU 18, e.g., by turning off one or more clocks of the CPU, and/or, e.g., placing the CPU power supply in a lower power mode, and to wake up the CPU, e.g., after some selected time, e.g., a few milliseconds. It is understood that one or more embodiments of the present application may be implemented with one or more computer readable media, wherein each medium may be configured to include thereon data or computer executable instructions for manipulating elements of the low power finger sensor 10 such as the power control unit 30 of the power conservation module 14, as described below. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including general purpose computers, special purpose computers, application-specific integrated circuit (ASIC), and digital/analog circuits with discrete components, and other computing devices, for example.

A. Power Conservation Methods

In an embodiment, the low power finger sensor 10 has at least two methods for conserving power during the use to scan a fingertip 40 of a finger 42 on the sensor surface 16 of the finger sensor 12, for navigation of a cursor, pointer or similar icon towards a target element. The first method for the conservation of power during the use of the low power finger sensor 10, for relatively fast motion of the fingertip 40 for rapidly navigating the cursor, pointer or similar icon towards a target element or position, is described in the present application.

B. Fast Finger Motions

Figure 3:
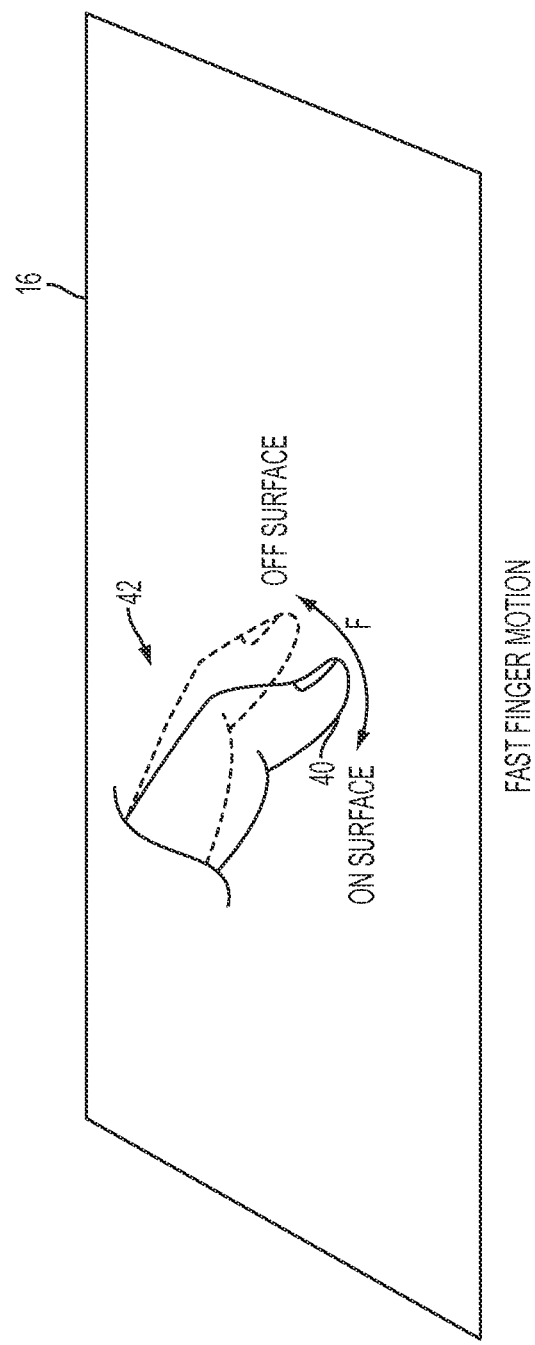
FIG. 3 is an illustration showing a finger in fast motion on a surface of the low power finger sensor shown in FIG. 1.

Referring to FIG. 3, the fingertip 40 of the finger 42 is depicted as quickly swiping on the sensor surface 16, then lifting, then swiping, then lifting, etc. The path of the swiping motion of the fingertip 40 is indicated by a curved arrow F. More particularly, the solid depiction of the fingertip 40 is shown contacting the sensor surface 16, and the phantom depiction of the fingertip 40 is shown not contacting the sensor surface 16.

The power conservation logic unit 28 monitors the finger on/off surface signals 32, e.g., as depicted in the left hand side of FIG. 5A, received from the finger sensor 12 and when it determines that the fingertip 40 is off of the sensor surface 16, it directs the power control unit 30 to send a finger sensor power control signal 34 to the CPU power supply 20 to turn the normal voltage Vreg (e.g., Vreg=1.2 volts) that powers the CPU 18 to off (i.e., Vreg is turned off, Vreg=0 volts). That is, the voltage to the CPU will be 0 V when the finger is detected to be "Off" the sensor, as depicted in the left hand side of FIGS. 5a and 5b. Coincidentally, the power control unit 30 also sends a WOE unit power control signal 36 to the WOE unit power supply 24 directing it to turn the voltage to the WOE unit 22 on, periodically, thereby turning the WOE unit 22 on periodically, as depicted in FIG. 5c while the finger is detected as "Off" the sensor (FIG. 5a). When the "event" is the fingertip 40 being detected as coming back into contact with the sensor surface 16 (for example, as shown in FIG. 5a), the CPU 18 operating at Vreg, e.g., 1.2V is turned back on, hence overall power consumption is reduced. The WOE unit 22 being periodically turned to "On" looks for the fingertip 40 to be on the sensor surface 16 (as, e.g., shown in the FIG. 5c "WOE unit status" graph). When the fingertip 40 is determined to be on the sensor surface 16, the WOE unit 22 sends a WOE unit power control signal 36 to the power control unit 30, to direct it to send a finger sensor CPU power control signal 34 to the CPU power supply 20 to restore the CPU 18 voltage to Vreg, e.g., 1.2 V as depicted in FIGS. 5b and 5c, whereby regular scanning begins, as indicated by the collection of scan lines as depicted in FIG. 5d while the CPU is turned "On" because the finger is detected as on the sensor surface 16 and moving with respect to the sensor surface 16.

More particularly, referring to the left hand side of FIGS. 5a-5d, the fingertip 40 of the finger 42 is picking, swiping and moving rapidly on the sensor surface 16. While the fingertip 40 is on the sensor surface 16 (as seen in FIG. 5a), the CPU power supply 20 voltage is Vreg (as seen in FIG. 5b) and the finger sensor 12 is scanning lines of data (as seen in FIG. 5d), and the finger sensor 12 is consuming maximum power. When the fingertip 40 leaves the sensor surface 16, the power conservation logic unit 28 detects this by monitoring the finger on/off surface signals 32 (seen in FIG. 5a), and it directs the power control unit 30 to send a finger sensor CPU power signal 34 to instruct the CPU power supply 20 to reduce the Vreg voltage to zero (seen in FIG. 5b) and thereby stop scanning data (see FIG. 5d). Coincidentally the power control unit 30 also directs the WOE unit power supply 24 to periodically power on the WOE unit 22 (or alternatively to remain on throughout the so-called "wait" mode), but only periodically connect to the sensor to see if the finger remains "Off" the sensor, thereby conserving power while the fast moving fingertip 40 is off of the sensor surface 16. This can be understood to be the state illustrated in FIG. 5c with the WOE unit being "On" periodically, e.g., when the voltage to the CPU 18 is "Off," i.e., 0V. This process can be repeated over and over again until the power conservation logic unit 28 of the power conservation module 14 determines that the fingertip 40 is moving slowly. It will be understood that in some embodiments there could be intermediate modes besides intermittently moving fast and more steadily moving slowly. When the fingertip 40 is determined to be on the sensor surface 16, but moving slowly, then a second method for the conservation of power may be utilized, as described below.

C. Slow or Fine Tuning Finger Motions

Figure 4:
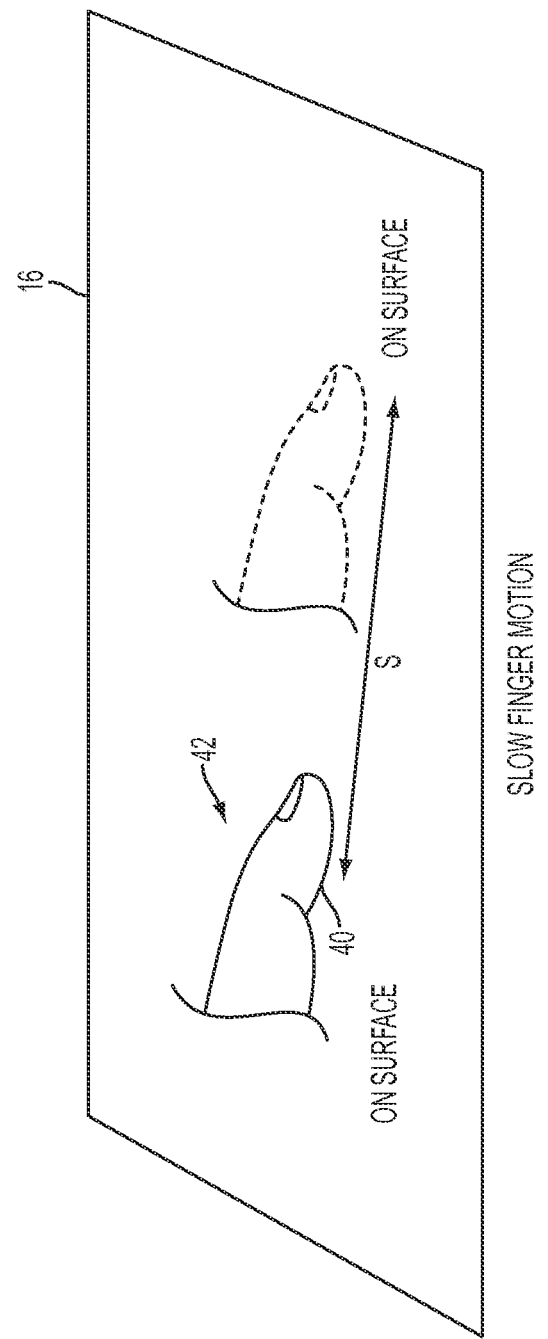
FIG. 4 is an illustration showing a finger in slow motion on the surface of the finger sensor shown in FIG. 1.

Referring to FIG. 4, the fingertip 40 of the finger 42 is depicted as moving more slowly over the sensor surface 16. The path of the motion of the fingertip 40 is generally indicated by a straight arrow S. The solid depiction of the fingertip 40 is shown contacting the sensor surface 16 at a beginning position, and the phantom depiction of the fingertip 40 is shown contacting the sensor surface 16 at an ending position. More particularly, when the fingertip 40 slows down during its movement on the sensor surface 16, for example, during fine tuning motions of the cursor when the cursor is closely approaching a target or position, the fingertip 40 moves slowly across the sensor surface 16, and many consecutive scan lines from the finger sensor 12 are redundant or substantially redundant. More particularity, referring to the FIG. 5c "WOE unit status" graph, the unique scanned lines are symbolized as solid black vertical lines, and the redundant scanned lines (vis-à-vis one or more precedingly detected scan lines) are symbolized as dashed black vertical lines. When enough consecutive scanned lines are redundant, which indicates that the fingertip 40 has not moved by a significant amount, as indicated in the middle of FIG. 5d, the CPU 18 of the finger sensor 12 can, e.g., be put into a lower power mode at a voltage Vlow (e.g., Vlow=0.6V instead of 1.2V) for a selectable and programmable amount of time, as indicated in FIG. 5b. Periodically the power conservation logic unit 28 can return the CPU 18 power supply to Vreg (as seen in FIG. 5b) such that the system and method reviews a few scan lines which it receives from the finger sensor 12 via a finger sensor scanned lines signal 38. If the few scanned lines are still substantially the same as the last unique line (i.e., still redundant), as indicated in the right hand portion of FIG. 5d, then Vlow, e.g., 0.6V, is maintained, thereby conserving power. When a unique line is detected, as indicated by the grouping on the far right of FIG. 5d, the power conservation logic unit 28 directs the CPU power supply 20 to apply Vreg to the CPU 18 (as seen in FIG. 5c), whereby regular scanning begins, and, necessarily, the finger is being detected to be "On" the sensor surface 16 (as seen in FIG. 5a).

Figure 5:
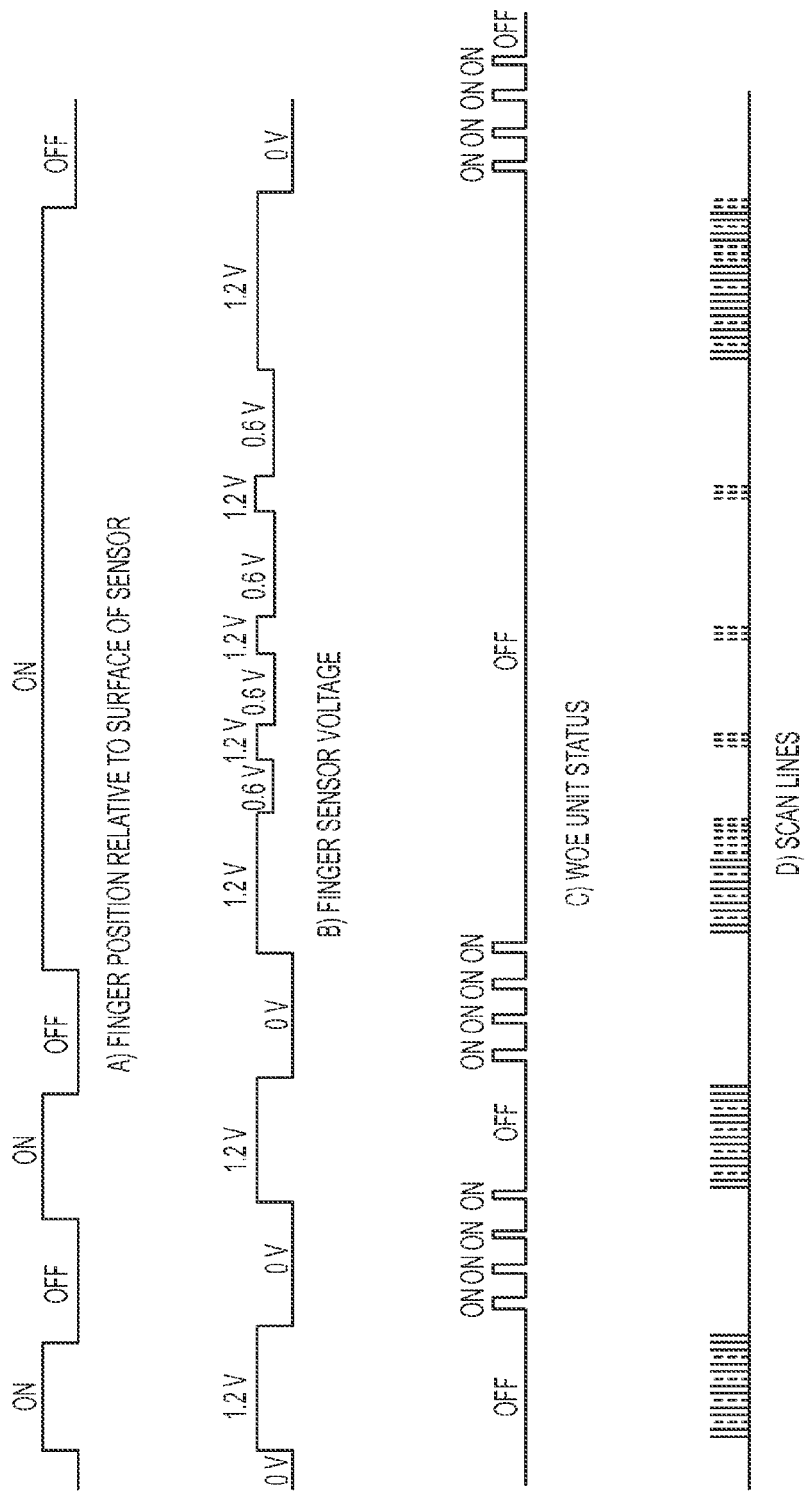
FIGS. 5a-d is a graph which depicts the position of a finger on the surface of the low power finger sensor (5A), the voltage applied to the low power finger sensor (5B), and the low power finger sensor wake-up on event unit status (5C), and the lines scanned by the low power sensor (5D).

More specifically, referring to the middle and right half of FIG. 5, as the finger motion slows down, the WOE unit 22 is not in operation (as seen in FIG. 5c) because the fingertip 40 remains touching the sensor surface 16 (as seen in FIG. 5a). As lines of data are scanned, some of them are unique (i.e., see for example, black lines as depicted on FIG. 5d) and some of them look mostly the same as the line(s) before them (as seen, for example, in the dashed black lines depicted on the right of FIG. 5d) because the finger has not moved by a significant amount. When enough successive redundant lines are seen, the power conservation logic unit 28 detects this, stops the scanning of data, and puts the finger sensor 12 into "WOE Retain" mode (right middle side of FIG. 5), wherein the CPU power supply 20 Vreg 1.20 volts is brought down to Vlow 0.6 volts and the CPU 18 clock is disabled so the CPU 18 can't perform any operations. Vlow is too low to operate the CPU 18 (i.e., clocking the CPU 18 is not allowed), but it is still high enough that the CPU 18 preserves all of it states. The fact that the CPU 18 is not operating reduces the power consumed by the finger sensor 12, and the fact that the voltage is lowered reduces the leakage current in the finger sensor 12, which also conserves power. After a programmable interval of time, the WOE state machine can, e.g., power up the CPU 18 and start the clocking of the CPU 18 again at Vreg, i.e., 1.2V as seen on the left of FIG. 5*b*. The CPU 18 will collect some more scan lines of data and the power conservation logic unit 28 will compare them with the last unique line that was detected. If the power conservation logic unit 28 determines that the lines of data are still too similar to the last unique line, and that the finger is moving so slowly that new finger scan line data is not required to be collected for a while, the CPU 18 be will be directed not to scan for a period of time. After a period of time the power conservation logic unit 28 can again collect some more scan lines of data and compare them with the last unique line that was detected. When the power conservation logic unit 28 detects unique lines of fingerprint image data, and the CPU 18 can be directed to stay awake and to continue to collect data. At the far right side of FIG. 5, the finger 42 leaves the sensor surface 16, after which and the processes described hereinabove can be repeated again upon the application finger navigational motions on the sensor surface 16 of the low power finger sensor 10.

It will be understood that in one embodiment, finger motion, per se, at least finger speed and finger movement direction, per se, need not be determined or known. The system and method may, e.g., detect and know that the finger is either on or off the sensor surface 16 (i.e., via signal 32 in FIG. 2) and the data being collected is either redundant or unique, as determined using signal 38 in FIG. 2. Based on those characteristics the system and method can then select the different power modes, including power savings modes. As an example, detection of the finger on or off the sensor can take precedence. For example, if the finger is off the sensor and the last data, e.g., fingerprint image data, was redundant, then the WOE state machine can be in a mode of waiting for the finger to return (the periodic "On" times of FIG. 5*c*), not the WOE retain mode (the periodic changes from Vreg to Vlow in FIG. 5*b*). However, if the finger is on the sensor surface 16, then the system and method may be in the "retain" mode reducing the voltage to the CPU 18 to Vlow and periodically increasing to Vreg to check for continuing redundancy in the scanned lines. It will be understood that the time periods during which the CPU 18 is returned to Vreg are relatively short and the scanning of a few lines can occur so fast that, even with a finger that is moving, but doing so slightly, can still keep the CPU power supply at Vlow (while scan line redundancy continues for some meaningful time) sufficiently to significantly reduce overall power consumption, and thus, increase overall battery life.

It will also be understood by those skilled in the art that a system and method is disclosed for conserving power during navigation using a fingerprint image sensor, which may comprise receiving at a computing device fingerprint image sensor data indicative of finger position with respect to a fingerprint image sensor surface in a finger navigation mode to determine if the finger is in a first finger navigation mode; processing via the computing device, fingerprint image sensor data to determine the presence of redundant fingerprint image data to detect the finger in a second finger navigation mode; and transitioning via the computing device, the finger sensor from a first power consumption mode to a second power consumption mode, based on detecting a transition from the first finger navigation mode to the second finger navigation mode.

The system and method may further comprise the first navigation mode being indicated by the finger being detected to relatively quickly be alternately in contact with and not in contact with the finger sensor surface, and sensed fingerprint image data being substantially non-redundant. That is to say, as will be understood by those skilled in the art, that the "scrolling" finger navigation mode may be detected by the occurrence of rapid changes of detection of the finger from "On" to "Off" and back to "On" the sensor surface, as is typical for such scrolling motions by a person using the device of the disclosed subject matter, which may be determined, e.g., from empirical data for a statistically significant portion of the population or even learned over time for a given user of the device, or both. Statistically significant variation from such a selected or determined range and/or number of successive "Ons" and "Offs" can also be used to determine that the user is not in or has discontinued the described "finger scrolling" navigational mode.

This system and method of the disclosed subject matter may comprise the second finger navigation mode being determined by the finger being detected to be in contact with the fingerprint image sensor surface and the sensed fingerprint image data being substantially redundant. It will be understood by those skilled in the art that substantially redundant does not require complete redundancy over any selected time period and that any redundancy at all need not switch the fingerprint image sensor from regular operation to "selection" navigation mode. That is to say, even in regular fingerprint image selection operating mode, occasionally due to such phenomena as a relatively slow swipe of the finger across the sensor surface and/or the effects of restriction, some redundancy is expected and normally handled by the fingerprint image reconstruction operation of a fingerprint imager of the type discussed in the present application. The substantial redundancy referenced in the disclosed subject matter refers to a persistent redundancy, e.g., for a period of time indicative of the fact the fingerprint image sensing system and method will not produce a reconstructed fingerprint image in a reasonable period of time, e.g., several seconds, and/or a reasonable number of total detected image scans from the fingerprint image sensor, e.g., within some multiple, e.g., 1-2 of a time or a number of scans that are ordinarily required to capture the required multiple images to reconstruct a single fingerprint image. These time periods or scan numbers or the like, useful in defining "substantially" in the context of such fingerprint image sensor systems and methods as discussed in the present application, if not already well known to those in the art, and, therefore not necessary of specific disclosure in the present application, are, at a minimum, discoverable without undue experimentation, and devices clear to anyone skilled in the art, as pertains to claim interpretation.

The system and method may further comprise the first finger navigation mode comprising a scrolling finger navigation mode and the first power consumption mode comprising a high power mode, e.g., a normal full power operating voltage, selected when the finger is moving in contact with the sensor surface and the second power consumption mode may be a zero, or substantially zero, power mode, e.g., a normal "Off" mode for the system or any respective component, selected when the finger is not in contact with the fingerprint image sensor surface.

The system and method may further comprise the second finger navigation mode comprising a selection finger navigation mode and the second power consumption mode may comprise an alternating low power mode (e.g., somewhere intermediate the normal operating voltage and zero voltage that, e.g., allows for the component being so powered to carry out some subset of its usual operations, but not all, i.e., is conserving power even at that intermediate voltage, and a high power (normal or substantially normal operating voltage) mode periodically selected to determine the continuing presence or the absence of the redundancy in the sensed fingerprint image data. As an example, as noted above, the intermediate "low power" voltage could allow a CPU to maintain all of its internal states, but not operate as a CPU, e.g., not be clocked.

It will be understood that a system and method are disclosed for conserving power during navigation, e.g., user device pointer/cursor navigation, using a fingerprint image sensor, that may comprise processing, via a computing device, fingerprint image sensor data indicative of finger position and movement with respect to a fingerprint image sensor surface in a finger navigation mode to determine if the finger is in a first finger navigation mode; processing, via the computing device, fingerprint image sensor data indicative of finger position and movement with respect to a fingerprint image sensor surface in a finger navigation mode to determine if the finger is in a second finger navigation mode; and transitioning, via the computing device, the fingerprint image sensor from a first power consumption mode to a second power consumption mode, based on detecting a transition from the first finger navigation mode to the second finger navigation mode.

The system and method may also comprise, wherein the first navigation mode is indicated by the finger being detected to relatively quickly be alternately in contact with and not in contact with the finger sensor surface. The system and method may also comprise, wherein the first navigation mode is indicated by the sensed fingerprint image data being substantially non-redundant. The system and method may also comprise the first navigation mode being indicated by the finger being detected to relatively quickly be alternately in contact with and not in contact with the finger sensor surface and the sensed fingerprint image data being substantially non-redundant.

The system and method may also comprise, wherein the second navigation mode is indicated by the finger being detected to be relatively steadily in contact with the finger sensor surface. The system and method may also comprise, wherein the second navigation mode is indicated by the sensed fingerprint image data being substantially redundant. The system and method may also comprise the first navigation mode being indicated by the finger being detected to be relatively steadily contact with the finger sensor surface and the sensed fingerprint image data being substantially redundant.

The system and method may also comprise periodically energizing, via the computing device, the fingerprint image sensor, during a period of time the fingerprint image sensor is determined to be in the first navigation mode, to detect a transition of the finger position from a first position relative to the fingerprint image sensor surface to a second position relative to the fingerprint image sensor surface; and determining, via the computing device, that fingerprint image sensor data received from the energized fingerprint image sensor is indicative of lateral motion of a finger being sensed in relation to the fingerprint image sensor surface. The system and method may also comprise periodically energizing, via the computing device, the fingerprint image sensor, during the a period of time the fingerprint image sensor is determined to be in the second navigation mode, to detect fingerprint image sensor data indicative of no lateral motion of a finger being sensed in relation to the fingerprint image sensor surface.

The system and method may also comprise a non-transitory computer readable medium storing instructions that, when executed by a computing device, cause the computing device to perform a method for conserving power during navigation using a fingerprint image sensor, the method which may comprise processing, via a computing device, fingerprint image sensor data indicative of finger position and movement with respect to a fingerprint image sensor surface in a finger navigation mode to determine if the finger is in a first finger navigation mode; processing, via the computing device, fingerprint image sensor data indicative of finger position and movement with respect to a fingerprint image sensor surface in a finger navigation mode to determine if the finger is in a second finger navigation mode; and transitioning, via the computing device, the fingerprint image sensor from a first power consumption mode to a second power consumption mode, based on detecting a transition from the first finger navigation mode to the second finger navigation mode.

It will be understood that the embodiments described herein are merely exemplary and that a person skilled in the art may make many variations and modifications without departing from the spirit and scope of the application. All such variations and modifications are intended to be included within the scope of the application as defined in the appended claims. As an example, the finger scanner can be a linear or two dimensional swiped scanner array. In addition, the rapid finger motion on and off the surfaces as described with respect to FIG. 3 could be invoking a scrolling navigational movement. In addition, the slower finger motion staying in contact with the sensor surface could also utilize finger speed as measured using the scan data, or otherwise. Also, a fast mode of operation like that described for FIG. 3 could be employed as the finger is sensed to be moving faster across the surface (e.g., above some threshold speed) moving rapidly towards a target or position and a slow mode, like that described for FIG. 4 when the finger is sensed to be more slowly moving (below some threshold speed) as the cursor or the like gets closer to the target or position and is focusing in on the particular target or position or hovering over such position. Also, the low power mode can be involved when the finger is removed from the surface and hovers over the cursor or the like after navigating the cursor or the like to the target or position which thereafter remains unmoving.

What is claimed:

1. A method for conserving power during navigation using a fingerprint image sensor, comprising:
   processing, via a computing device, fingerprint image sensor data indicative of finger position and movement with respect to a fingerprint image sensor surface in a finger navigation mode to determine if the finger is in a first finger navigation mode;
   processing, via the computing device, fingerprint image sensor data indicative of finger position and movement with respect to a fingerprint image sensor surface in a finger navigation mode to determine if the finger is in a second finger navigation mode; and
   transitioning, via the computing device, the fingerprint image sensor from a first power consumption mode to a second power consumption mode, based on detecting a transition from the first finger navigation mode to the second finger navigation mode;
   wherein the second navigation is indicated by the finger being detected to be steadily in contact with the linger sensor surface and/or the sensed fingerprint image data being substantially redundant.

2. The method of claim 1, wherein the first navigation mode is indicated by the finger being detected to be alternately in contact with and not in contact with the finger sensor surface.

3. The method of claim 1, wherein the first navigation mode is indicated by the sensed fingerprint image data being substantially non-redundant.

4. The method of claim 1, wherein the first navigation mode is indicated by the finger being detected to be alternately in contact with and not in contact with the finger sensor surface and the sensed fingerprint image data being substantially non-redundant.

5. The method of claim 1, wherein the second navigation mode is indicated by the finger being detected to be steadily in contact with the finger sensor surface.

6. The method of claim 1, wherein the second navigation mode is indicated by the sensed fingerprint image data being substantially redundant.

7. The method of claim 1, wherein the first navigation mode is indicated by the finger being detected to be steadily contact with the finger sensor surface and the sensed fingerprint image data being substantially redundant.

8. The method of claim 1, further comprising:
periodically energizing, via the computing device, the fingerprint image sensor, during a period of time the fingerprint image sensor is determined to be in the first navigation mode, to detect a transition of the finger position from a first position relative to the fingerprint image sensor surface to a second position relative to the fingerprint image sensor surface; and
determining, via the computing device, that fingerprint image sensor data received from the energized fingerprint image sensor is indicative of lateral motion of a finger being sensed in relation to the fingerprint image sensor surface.

9. The method of claim 1, further comprising:
periodically energizing, via the computing device, the fingerprint image sensor, during the a period of time the fingerprint image sensor is determined to be in the second navigation mode, to detect fingerprint image sensor data indicative of no lateral motion of a finger being sensed in relation to the fingerprint image sensor surface.

10. A fingerprint image sensor, comprising:
a computing device, configured to:
process fingerprint image sensor data indicative of finger position and movement with respect to a fingerprint image sensor surface in a finger navigation mode to determine if the finger is in a first finger navigation mode;
process fingerprint image sensor data indicative of finger position and movement with respect to a fingerprint image sensor surface in a finger navigation mode to determine if the finger is in a second finger navigation mode; and
transition the fingerprint image sensor from a first power consumption mode to a second power consumption mode, based on detecting a transition from the first finger navigation mode to the second finger navigation mode;
wherein the second navigation mode is indicated by the finger being detected to be steadily in contact with the finger sensor surface and/or the sensed fingerprint image data being substantially redundant.

11. The fingerprint image sensor of claim 10, wherein the first navigation mode is indicated by the finger being detected to be alternately in contact with and not in contact with the fingerprint image sensor surface.

12. The fingerprint image sensor of claim 10, wherein the first navigation mode is indicated by the sensed fingerprint image data being substantially non-redundant.

13. The fingerprint image sensor of claim 10, wherein the first navigation mode is indicated by the finger being detected to be alternately in contact with and not in contact with the fingerprint image sensor surface and the sensed fingerprint image data being substantially non-redundant.

14. The fingerprint image sensor of claim 10, wherein the second navigation mode is indicated by the finger being detected to be steadily in contact with the finger sensor surface.

15. The fingerprint image sensor of claim 10, wherein the second navigation mode is indicated by the sensed fingerprint image data being substantially redundant.

16. The fingerprint image sensor of claim 10, wherein the first navigation mode is indicated by the finger being detected to be steadily in contact with the finger sensor surface and the sensed fingerprint image data being substantially redundant.

17. The fingerprint image sensor of claim 10, wherein the computing device is further configured to:
periodically energize the fingerprint image sensor, during a period of time the fingerprint image sensor is determined to be in the first navigation mode, to detect a transition of the finger position from a first position relative to the fingerprint image sensor surface to a second position relative to the fingerprint image sensor surface; and
determine that fingerprint image sensor data received from the energized fingerprint image sensor is indicative of lateral motion of a finger being sensed in relation to the fingerprint image sensor surface.

18. The fingerprint image sensor of claim 10, wherein the computing device is further configured to:
periodically energize the fingerprint image sensor, during the a period of time the fingerprint image sensor is determined to be in the second navigation mode, to detect fingerprint image sensor data indicative of no lateral motion of a finger being sensed in relation to the fingerprint image sensor surface.

19. A non-transitory computer readable medium storing instructions that, when executed by a computing device, cause the computing device to perform a method for conserving power during navigation using a fingerprint image sensor, the method comprising:
processing, via a computing device, fingerprint image sensor data indicative of finger position and movement with respect to a fingerprint image sensor surface in a finger navigation mode to determine if the finger is in a first finger navigation mode;
processing, via the computing device, fingerprint image sensor data indicative of finger position and movement with respect to a fingerprint image sensor surface in a finger navigation mode to determine if the finger is in a second finger navigation mode; and
transitioning, via the computing device, the fingerprint image sensor from a first power consumption mode to a second power consumption mode, based on detecting a transition from the first finger navigation mode to the second finger navigation mode;
wherein the second navigation mode is indicated by the finger being detected to be steadily in contact with the finger sensor surface and/or the sensed fingerprint image data being substantially redundant.

20. The non-transitory computer readable medium according to claim 19, wherein the method further comprises:
- periodically energizing, via the computing device, the fingerprint image sensor, during a period of time the fingerprint image sensor is determined to be in the first navigation mode, to detect a transition of the finger position from a first position relative to the fingerprint image sensor surface to a second position relative to the fingerprint image sensor surface; and
- determining, via the computing device, that fingerprint image sensor data received from the energized fingerprint image sensor is indicative of lateral motion of a finger being sensed in relation to the fingerprint image sensor surface.

\* \* \* \* \*